United States Patent Office 3,564,007
Patented Feb. 16, 1971

3,564,007
PRODUCTION OF UNSATURATED NITROGEN-CONTAINING COMPOUNDS
Eric W. Stern, Mountainside, and Marshall L. Spector, Livingston, N.J., assignors, by mesne assignments, to W. R. Grace & Co., New York, N.Y., a corporation of Connecticut
No Drawing. Continuation-in-part of application Ser. No. 78,111, Dec. 23, 1960. This application May 19, 1964, Ser. No. 368,681
Int. Cl. C07c 87/24, 103/30; C07d 27/68
U.S. Cl. 260—315                                    30 Claims

ABSTRACT OF THE DISCLOSURE

Process for preparing N-substituted alpha,beta-ethylenically unsaturated compounds which comprises reacting an ethylenically unsaturated compound having at least one

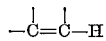

group with an organic amine or amide compound having at least one N-bonded hydrogen atom; in the presence of a salt of a Group VIII metal having an atomic number of at least 44.

---

This application is a continuation-in-part of our prior copending application Ser. No. 78,111, filed Dec. 23, 1960, and now U.S. Pat. No. 3,479,392, dated Nov. 18, 1969.

The present invention relates to an improved process for the production of ethylenically unsaturated nitrogen-containing compounds. In one aspect the present invention relates to a method for the production of amines having an ethylenically unsaturated radical bonded to nitrogen such as N-alkylene amines. In another aspect the present invention relates to a method for the production of carboxylic acid amides having an ethylenically unsaturated radical bonded to nitrogen such as N-alkylene amides.

Among the unsaturated nitrogen-containing compounds used in industry today are N-vinyl amines such as N-vinyl carbazole and N-vinyl amides such as 1-vinyl-2-pyrrolidone. These compounds are particularly useful as monomers for the manufacture of corresponding polymers. For example, vinyl carbazole is the monomer for the manufacture of thermoplastic resins (e.g., polyvinylcarbazole) used in the field of electrical insulation. It is known that such vinyl compounds can be produced by reacting the amine or amide with acetylene under pressure at elevated temperatures in the presence of catalysts comprising alkali metal salts. For example, N-vinyl carbazole is produced by reacting acetylene and carbazole under a pressure of about 15 atmospheres at 180° C. using a mixed potassium hydroxide-zinc oxide catalyst. Similarly, 1-vinyl-2-pyrrolidone is produced by reacting pyrrolidone with acetylene at a pressure of about 15 atmospheres and a temperature of 140°–160° C. using a powdered potassium hydroxide catalyst. In accordance with these methods, the triple bond of the acetylene is converted to an ethylenic point of unsaturation due to the addition of the amine or amide across the triple bond. There are, however, several drawbacks to such processes. For example, due to the fact that purification of acetylene is relatively difficult and involves special techniques which add to the cost of the raw material as compared, for example, with ethylene, the cost of the final product is necessarily enhanced. In addition, special techniques and precautions are required in handling acetylene due to its explosive nature. Therefore, a process by which vinyl substituted amines and amides may be produced from a source other than acetylene is highly desirable.

It is an object of this invention, therefore, to provide a novel and improved method for producing unsaturated derivatives of amines and carboxylic acid amides.

Another object is to provide a process for producing ethylenically unsaturated derivatives of amines and amides such as the N-alkylene derivatives from a reactant other than acetylene or acetylenic compounds.

Another object is to provide a process for reacting an olefin with an amine or amide such that the aliphatic unsaturation of the olefin is retained to produce an unsaturated derivative of the amine or amide.

Another object is to provide a generally improved and economical method for producing vinyl amines such as N-vinyl carbazole.

Still another object is to provide a new and improved process for producing vinyl amides such as 1-vinyl-2-pyrrolidone.

Various other objects and advantages of this invention will become apparent to those skilled in the art from the accompanying description and disclosure.

In accordance with the present invention, nitrogen-substituted olefins are produced by the process which comprises reacting an ethylenically unsaturated compound and an organic nitrogen-containing compound having at least one hydrogen atom bonded to nitrogen including amines and carboxylic acid amides in the presence of a Group VIII metal salt under substantially anhydrous conditions. The ethylenically unsaturated or olefinic reactant contains at least one

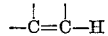

group, and the nitrogen-containing reactant may be represented by the general formula H—A in which H is reactive hydrogen and A is a nitrogen-containing radical the nitrogen atom of which is bonded to said hydrogen as in amines and amides. Under the reaction conditions employed in accordance with the teachings of this invention, the nitrogen-containing radical (A) replaces the hydrogen of the

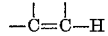

group of the olefinic reactant, yielding as a product of the process, an unsaturated derivative of the amine or amide having the group,

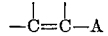

the nitrogen of the A radical being bonded to the point of unsaturation. Thus, it is seen that the indicated point of unsaturation in the olefin reactant does not become saturated by the addition of the amine or amide reactant but is unexpectedly retained due to a substitution reaction.

In order to accomplish the desired production of the nitrogen-substituted olefin, the presence reaction is effected in the presence of a compound of a Group VIII metal having an atomic number of at least 44, including palladium, platinum, ruthenium, iridium, rhodium and osmium and mixtures thereof. Suitable salts of these metals which may be used in accordance with the teachings of this invention include the halides, acetates, sulfates, nitrates, cyanides and complex salts. The preferred Group VIII metal salts are the halides, represented by the general formula $MX_n$, in which M is one of the aforesaid Group VIII metals, X is any of the halogens (F, Cl, Br, I), and $n$ is an integer from 2 to 6. The Group VIII metal salt may be unsupported, or it may be used in combination with a support, carrier or diluent, typical examples of which are alumina, silica gel, celite and alundum. Typical examples of suitable Group VIII metal compounds are: palladous chloride, palladous bromide, palladous iodide, palladium trifluoride, palladium acetate, platinous chloride, platinous bromide, platinous cyanide, platinum tetrafluoride, platinum tetrachloride, platinum tetrabromide, sodium chloropalladite, potassium chloroplatinate, potassium clhoropalladite, rhodium trichloride, rhodium trisulfate, ruthenium trichloride, ruthenium tribromide, ruthenium disulfate, osmium dichloride, osmium tetrachloride, iridium trichloride, iridum tribromide and iridium trifluoride. It will be noted that the metal moiety of the foregoing metal compounds is a precious metal of the transition series. These metal compounds are reducible metal compounds which are capable of possessing the higher of two stable valence states while complexed with the ethylenically unsaturated or olefinic reactant. Although any of the Group VIII noble metals may be used, palladium compounds are preferred, the other metal compounds being somewhat less reactive. For convenience, the following discussion is largely made specific to the use of palladium chloride, but it is to be understood that such specific teachings also apply to the use of the other Group VIII metal salts.

The Group VIII metal salt such as palladium chloride may be added to the reaction zone as such, or it may be added as a preformed complex with the ethylenically unsaturated reactant. The palladium chloride may also complex with the ethylenically unsaturated compound in situ. The replacement of the hydrogen of the aliphatic

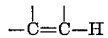

group with the nitrogen-containing radical of the amine or amide reactant is accomplished by the formation of metallic palladium. The overall reactions proceed in accordance with the following equations in which the olefin reactant is represented by the group,

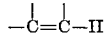

and the amine and amide reactants are represented by the groups,

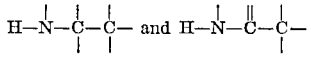

respectively:

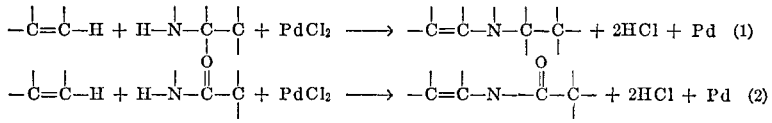

Thus, the Group VIII metal salt typically represented by palladous chloride, functions as a reactant in the sense that it undergoes chemical change to elemental metal.

The ethylenically unsaturated organic compound which is interacted with the nitrogen-containing reactant includes substituted and unsubstituted aliphatic acyclic and alicyclic compounds containing from 2 to 200 or more carbon atoms per molecule and at least one aliphatic

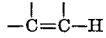

grouping. The acyclic aliphatic compounds are conveniently represented by the general formula:

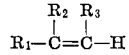

in which the $R_1$, $R_2$ and $R_3$ radicals may be hydrogen or organic radicals including substituted and unsubstituted alkyl, cycloalkyl, alkenyl, cycloalkenyl, ethynyl, and aromatically unsaturated radicals such as aryl and aralkyl groups. When the $R_1$, $R_2$ and $R_3$ groups are organic radicals, they may be substituted with various substituents such as halogen, aryl, aryloxy, alkoxyl, nitro, acyl, and acyloxy radicals.

Instead of being bonded to the $R_2$ and $R_3$ radicals, the carbon atoms of the

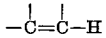

group may be bonded to one or more methylene radicals forming a carbocyclic compound having the general formula:

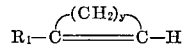

in which $R_1$ is as above defined and $y$ is usually an integer from 1 to 6. The hydrogen atoms of the methylene group or groups of the carbocyclic olefins may be substituted with substitutents which may be the same or different from the $R_1$ radical.

It is to be understood that the indicated R radicals may be the same or different, and that no olefin reactant may contain, in addition to the one point of atttack, i.e., the

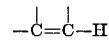

grouping, one or more additional ethylenic carbon-to-carbon double bonds having replaceable hydrogen attached thereto as in polyolefins, in which case a polysubstituted olefin may be produced.

The preferred olefinic reactants is typically represented by the formula:

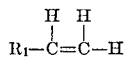

in which $R_1$ is hydrogen, an alkyl radical having from 1 to about 20 carbon atoms, or an aryl radical and thus is an ethylenically unsaturated hydrocarbon free of acetylenic unsaturation.

Typical examples of suitable olefins which may be employed as reactants in accordance with the present invention are the hydrocarbon olefins such as ethylene, propylene, butene, pentene, hexene, heptene, decene, dodecene, isobutene, isopentene, isooctene, butadiene, isoprene, 2,3-dimethylbutadiene, pentadiene-1,4, cyclopentyl ethylene, cyclopentene, cyclohexene, cyclopentadiene, styrene, alpha-methylstyrene, para-ethylstyrene, 2,4-dimethylstyrene, vinyl acetylene, divinyl acetylene, vinyl diacetylene; allyl chloride, 3,4-dichlorostyrene, 1 - chloro - 3 - butene, and other substituted olefins such as, for example, methyl methacrylate, ethyl acrylate, methyl vinyl ether, propyl vinyl ether and vinyl acetate.

The olefin reactant also may be a high molecular weight material such as polymers containing points of ethylenic unsaturation such as polybutadiene, polychloroprene and polyisoprene. Such high molecular weight olefinic materials dispersed in a suitable medium such as benzene, are advantageously reacted with the amine or amide reactants to incorporate reactive sites for further utilization of the polymer or modification of its properties. For example, reaction of such polymers with the amines incorporates dye receptor sites at the points of unsaturation.

The nitrogen-containing reactants which are reacted with the above olefinic reactants have at least one and no more than two hydrogen atoms bonded to nitrogen and are represented by the general formula H—A in which H is hydrogen and A is an amino or amido anion containing at least one nitrogen atom bonded to said hydrogen (H) and includes radicals in which nitrogen is part of a ring, referred to herein as the heterocyclic amines and amides, and radicals in which nitrogen is not part of a ring, referred to herein as the acyclic amines and amides. The nitrogen-containing reactants include, therefore, acyclic primary and secondary amines, represented by the general formulas, H—NHR and H—N(R)$_2$, respectively; acyclic primary and secondary amides, represented by the general formulas H—NHCOR' and H—NR"COR', respectively; heterocyclic amines and amides which are secondary; and compounds having more than one primary or secondary amino and amido groups which compounds are referred to herein as the polyamines and polyamides. The indicated R, R' and R'' radicals of the amines and amides may contain from 1 to 30 carbon atoms per radical or as many as 200 or more carbon atoms as in polymeric amines and amides, and usually from 1 to about 20 carbon atoms. The R, R' and R'' may be alkyl

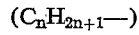

alkenyl ($C_nH_{2n}$—), cycloalkyl, cycloalkenyl or aryl radicals which may be unsubstituted or substituted such as haloalkyl radicals; alkyl-, nitro- and halo-substituted aryl radicals and polymethylene amino and amido radicals. In addition to being one of the enumerated organic radicals, the R' radical of the amide may be hydrogen. The heterocyclic amines and amides contain from 3 to about 20 carbon atoms per molecule, and preferably from 4 to 14 carbon atoms.

Typical examples of suitable amines which are reacted with the olefinic reactant to produce amines having an ethylenically unsaturated radical bonded to the nitrogen are: the primary and secondary amines including straight chain and branched chain amines of the homologous series, $C_nH_{2n+1}NH_2$ and $(C_nH_{2n+1})_2NH$ wherein $n$ is an integer usually from 1 to 20 such as methyl amine, ethyl amine, normal propyl amine, butyl amine, octyl amine, dodecyl amine, dimethyl amine, diethyl amine, di-n-propyl amine, isopropyl amine, diisopropyl amine, isobutyl amine, 2-ethyl butyl amine, ethyl propyl amine; alkenyl amines such as allyl amine; aromatic amines such as aniline, methyl aniline and diphenyl amine; heterocyclic amines such as carbazole, pyrrole and piperidine; and polyamines such as ethylene diamine, hexamethylene diamine and melamine. Typical examples of suitable amides which can be employed in the process of this invention are: formamide and the primary and secondary amides including the straight chain and branched chain compounds of the homologous series, $C_nH_{2n+1}CONH_2$ and

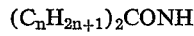

wherein $n$ has a value usually from 1 to about 20 such as acetamide (propionamide, caproamide, palmitic acid amide, and corresponding N-alkyl substituted amides such as N-methyl acetamide, N-butyl acetamide, etc.; unsaturated amides such as acrylamide; aryl-substituted amides such as benzamide; heterocyclic amides such as pyrrolidone and 5-methyl-2-pyrrolidone; poly amides such as oxamide, malonamide and succinamide as well as polymeric materials containing a recurring amide grouping such as in polyacrylamide, polyamides of the nylon series such as those formed by condensation of adipic acid and hexamethylene diamine, as well as polyurethanes which are formed by copolymerization of polyols such as propylene glycol and isocyanates. These latter higher molecular weight polymeric compounds containing secondary amide groups are suitable reactants in that the hydrogen bonded to the nitrogen of the amido groups interacts with the olefinic reactant such as ethylene to incorporate points of unsaturation such as vinyl groups into the molecule for further reaction and cross-linking of the polymer.

Illustrative equations representing the reactions of the presently described process are as follows in which ethylene is used to represent the olefin reactants:

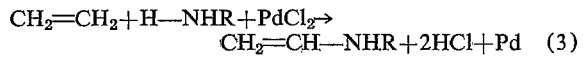

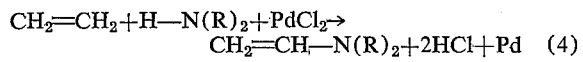

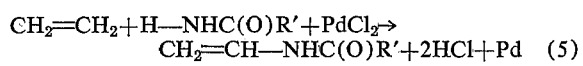

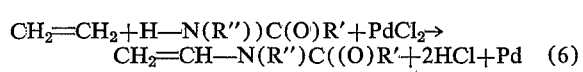

wherein the R, R' and R'' groups are as previously described.

As further illustrative of the scope of the present invention, the following equation illustrates the reaction between the olefinic reactant typically represented by ethylene, and a polyfunctional nitrogen-containing compound typically illustrated by hexamethylene diamine:

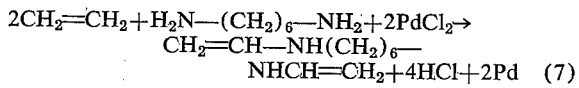

Another valuable vinyl compound particularly useful for the manufacture of thermoplastic resins of good electrical properties is N-vinyl carbazole which also may be produced in accordance with the teachings of this invention, as shown in the following equation:

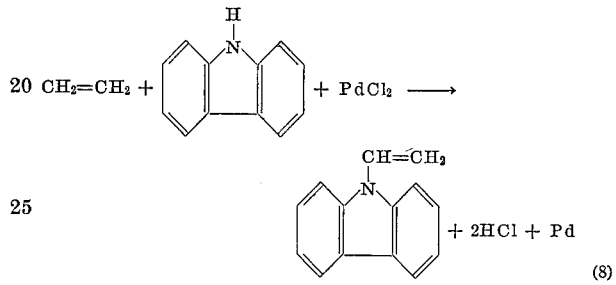

Similarly 1-vinyl-2-pyrrolidone may be produced by reacting ethylene with pyrrolidone as follows:

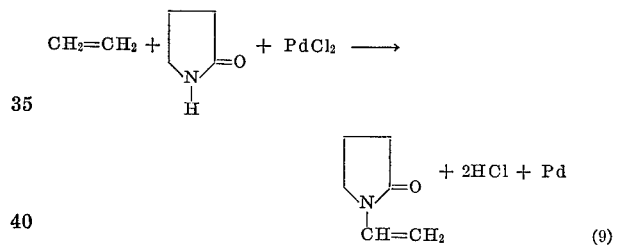

From the above, it is apparent that by the process of this invention a general vinylation reaction is provided by which valuable unsaturated derivatives of primary and secondary amines and amides are produced from ethylenically unsaturated compounds.

The process of the present invention is conducted under substantially anhydrous conditions and may be conducted in the liquid or vapor phase. The temperature of reaction may vary over a relatively wide range of temperature and pressure conditions without departing from the scope of this invention. Generally speaking, the temperature of reaction will be above the freezing point of the particular reaction mixture and below the decomposition temperature of the reactants or product. Thus, the reaction temperature may range between about −15° F. and about 400° F., more usually between a temperature from room temperature (70° F.) to about 300° F. The pressure may also vary over relatively wide ranges and may be above atmospheric, atmospheric, or below atmospheric pressure. For example, within the above temperature ranges the pressure may be between about 0 and about 10,000 pounds per square inch gauge or more. The relative concentration of olefin and nitrogen-containing reactants and Group VIII metal salt may vary over relatively wide ranges without departing from the scope of this invention. With respect to the relative concentration of olefin and nitrogen-containing compound, stoichiometric quantities may be used or an excess of either reactant may be present.

As shown in the above equations, the hydrogen bonded to nitrogen of the amine or amide reacts with the halogen released by the Group VIII metal salt to form hydrogen halide. If desired, therefore, a hydrogen halide acceptor may be employed. Since the process is effected under anhydrous conditions, the hydrogen halide acceptor, when used, is one which does not form water upon neutralization with the hydrogen halide by-product. Thus, suitable and typical hydrogen halide acceptors are the phosphates including the alkali metal or alkaline earth metal hydrogen phosphates such as sodium dihydrogen phosphate, sodium monohydrogen phosphate, and ammonium phosphates. When the nitrogen-containing reactant is an amine, an excess of the amine can be employed as the hydrogen halide acceptor.

The process may be carried out in batchwise or continuous systems without departing from the scope of this invention. The reaction may be effected in the presence of liquid diluents or solvents in which the reactants are dissolved or dispersed by mechanical agitation or other means. Suitable solvents include non-polar organic liquids such as saturated hydrocarbons such as isooctane, cyclohexane, pentane, etc.; and aromatics such as benzene, xylene or toluene. The preferred solvents are polar organic solvents including ethers such as ethyl ether, diphenyl ether, tetrahydrofuran, dioxane, 1,2-dimethoxyethane, diethylene glycol, diethyl ether and amides such as dimethylformamide, dimethylacetamide; sulfoxides and sulfones such as dimethylsulfoxide and dimethylsulfone; and gamma-butyrolactone.

The Group VIII metal salt which is converted to elemental metal during the course of the reaction, may be regenerated and reused in the reaction. One method of regeneration involves reacting the metal with hydrogen halide and oxygen at an elevated temperature of between about 80° and about 500° F., usually between about 150° and about 450° F. Thus, when palladium chloride is employed as the Group VIII metal salt, for example, it may be regenerated by reacting the palladium metal with hydrogen halide and oxygen or an oxygen-containing gas including air, the water vapor being driven off as it forms, in accordance with the following equation:

$$Pd + 2HCl + \tfrac{1}{2}O_2 \rightarrow PdCl_2 + H_2O \qquad (10)$$

The source of the hydrogen halide employed in the regeneration step may be any extraneous source or may be the hydrogen halide produced as a by-product of the present reaction, when necessary, utilizing hydrogen halide make-up from an external source. It is postulated without limiting the scope of this invention, that when a hydrogen halide acceptor such as disodium hydrogen phosphate is employed, it reacts with the hydrogen chloride evolved as a result of the reaction between the olefin, amine or amide reactant and palladous chloride, particularly at an elevated temperature (e.g., about 200° F.) to yield sodium chloride and phosphoric acid. One method for regenerating the disodium hydrogen phosphate as well as the palladous chloride is to effect the regeneration step at an elevated temperature (e.g., about 375° F.) to yield hydrogen chloride and disodium hydrogen phosphate, the hydrogen chloride so released reacting with the elemental palladium and oxygen to regenerate the palladous chloride and liberating water according to the following equations:

$$2\,HCl + Na_2HPO_4 \xrightleftharpoons[375°\ F.]{200°\ F.} 2NaCl + H_3PO_4 \qquad (11)$$

$$2HCl + Pd + \tfrac{1}{2}O_2 \xrightarrow{375°\ F.} PdCl_2 + H_2O \qquad (12)$$

It is noted that, although the regeneration of the palladous chloride may be effected without the addition of hydrogen chloride from an extraneous source, it has been found that the addition of a small amount of hydrogen chloride gas from an external source may also be used and is preferred practice.

Another method of effecting regeneration of the Group VIII metal salt involves reacting the noble metal with compounds of metals which can exist in more than one oxidation state, more particularly, compounds of polyvalent metals which are readily reduced to a lower valence state. Typical examples of compounds which may be reacted with the elemental Group VIII metal are compounds of copper, mercury, cerium, tantalum, tin, lead, titanium, vanadium, antimony, chromium, molybdenum, uranium, manganese, iron, cobalt, nickel, osmium, etc. Thus, for example, palladous chloride may be regenerated from palladium by interacting the palladium with chlorides of such metals of which cupric chloride and ferric chloride are preferred. Thus, when palladium is interacted with cupric chloride, the reaction proceeds as follows:

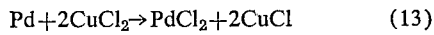

$$Pd + 2CuCl_2 \rightarrow PdCl_2 + 2CuCl \qquad (13)$$

Another method of regenerating the Group VIII metal salts such as the metal halides is to react the metal with halogen at an elevated temperature. It is to be understood that the formation of the elemental noble metal may not be apparent when the regeneration is carried out simultaneously with the reaction between the olefin and amine or amide.

In accordance with one embodiment of this invention, the process and regeneration step may be carried out simultaneously employing at least two reactors. In accordance with this embodiment, the reaction between the olefinic reactant and amine or amide reactant in the presence of the Group VIII metal salt is effected in one reactor and when ethylene is employed, palladium deposits as shown in Equation 1 above. The hydrogen halide evolved is either removed from the reactor, or, when a hydrogen halide acceptor such as an alkali metal phosphate is used, it combines therewith. At any suitable time such as when it appears that the Group VIII metal salt has been substantially converted to the metal, the flow of reactants to this reactor is stopped and the reactants passed to a second reactor containing the Group VIII metal salt. The Group VIII metal in the first reactor is now treated with hydrogen halide and oxygen to regenerate the salt after which the reactants may be passed therethrough once again. By so conducting the process in this manner, a continuous and regenerative process is provided.

It is to be understood that the choice of temperature of reaction, contact time, molar quantities of reactants and Group VIII metal salts to be preferred in any instance will depend upon the starting material employed and the result desired, and that the procedure employed for the isolation and purification of desired product will depend upon the physical nature and activity of the products. Side reactions can be avoided by separating the desired product from the reaction mixture as it is formed or by conducting the reaction in dilute phase. Although the theory and mechanism of reaction is believed to be correct, other theories may explain the reaction of the present invention, and the theories advanced herein are not to be construed as an unnecessary limitation on the invention.

The following examples are offered as a further understanding of the present invention and are not to be construed as necessarily limiting thereto. In each of the following examples, the manipulative steps and reactions were performed under substantially anhydrous conditions, using anhydrous reactants.

EXAMPLE I

To a reactor fitted with a vibromix stirrer and connected to a gas manifold via a condenser, there were added 8.88 grams (0.05 mole) of palladous chloride ($PdCl_2$) and 14.2 grams (0.1 mole) of predried disodium hydrogen phosphate. The reactor and its contents were heated at 212° F. under vacuum overnight. The reactor was cooled to room temperature and a solution containing 8.36 grams (0.05 mole) of predried carbazole in 150 ml. of dry 1,2-dimethoxyethane was injected. The reactor was pressured with ethylene to a pressure of 1 atmosphere gage. The temperature of the mixture was then increased with mixing to 180° F. Pressure was maintained at 1 atmosphere gage and reaction conditions were maintained for approximately 8 hours. During this time the solids in the reactor became black in color and a palladium mirror formed on the sides of the reactor.

The reactor contents were filtered through a fritted glass funnel and the solids were washed with several portions of dry 1,2-dimethoxyethane. The solvent was stripped from the combined filtrate and washings under vacuum on a rotary evaporator. The residue from this operation (9 grams) was subjected to ultraviolet spectroscopic analysis and was shown to contain 3.73 grams of N-vinyl carbazole or a yield of 38 mole percent on the basis of carbazole.

EXAMPLE II

In this example, substantially the same procedure was employed as described in Example I above except that pyrrolidone was employed as the reactant in place of carbazole. Thus a mixture consisting of 8.88 grams (0.05 mole) of palladous chloride and 14.2 grams of predried disodium hydrogen phosphate was charged to the reactor and the mixture was heated at 212° F. under vacuum for several days. After cooling, a solution containing 4.25 grams (0.05 mole) of purified pyrrolidone in 125 ml. of dry 1,2-dimethoxyethane was injected. The reactor was pressured to 1 atmosphere gage with ethylene with mixing. The temperature was raised to 150° F. and these conditions were maintained for approximately 16 hours. During this time the solids in the reactor turned black and a palladium mirror formed on the sides of the reactor.

The reactor contents were filtered through a fritted glass funnel and the solids on the filter were washed with several portions of dry 1,2-dimethoxyethane. Pellets of potassium hydroxide were added to the filtrate and washings to stabilize the product. The solvent was removed from the combined filtrate and washings under vacuum on a rotary evaporator. The residue (2.59 grams) was shown to contain 0.60 gram of N-vinyl-pyrrolidone by ultraviolet spectroscopic analysis, constituting a yield of 11 percent, on the basis of pyrrolidone.

EXAMPLE III

In a 500 ml. baffled, round bottom flask fitted with a sealed magnetic stirring unit and connected to a gas manifold through a condenser, 13.6 grams (0.015 mole) of palladous chloride were heated at 212° F. under vacuum overnight. After cooling to room temperature, 100 ml. of dry 1,2-dimethoxyethane was injected. The suspension was saturated with isobutene to a final pressure of 82 mm. gage. Predried diethylamine (23.5 ml.) was injected. A pressure drop to minus 47 mm. gage was noted and the color of the suspension gradually changed from brick red through light coffee to yellow. The system was repressured to 60 mm. gage and the temperature raised gradually to 135° F. Stirring was continued at this temperature for approximately 8 hours with pressure being maintained between 650 and 680 mm. gage by intermittent addition of isobutene. During this time, the color of suspended solids changed from yellow to dark gray. An additional 7 ml. of diethylamine was injected and the system pressured to 738 mm. gage. Stirring at 135° F. was then continued for 8 hours.

The mixture was then cooled to room temperature and filtered through a fritted glass funnel. This operation was carried out in a dry bag under nitrogen. The clear filtrate was yellow in color while the solids remaining on the filter were dark gray-black. The solids were washed with additional portions of dry 1,2-dimethoxyethane and the solvent distilled from the combined filtrate and washings under a vacuum of 262–265 mm. absolute. The brown residual material from the distillation (1.3 grams) was shown to contain 0.7% diethylisobutenylamine by vapor phase chromatography. This constitutes a yield of 0.12 mole percent, on the basis of palladium chloride.

Other ethylenically unsaturated derivatives may similarly be produced by the reaction of an ethylenically unsaturated compound having a replaceable hydrogen bonded to at least one of the carbon atoms of the eth- ylenic double bond, and the amine or amido reactant having reactive hydrogen bonded to nitrogen in the presence of the Group VIII noble metal salts such as palladium chloride. Similar reactions of ethylene, propylene, butylene for example, and other primary and secondary amines or amides may be prepared in accordance with the foregoing description and specific examples to produce corresponding N-vinyl, N-isopropenyl and N-isobutenyl derivatives, respectively.

It is to be understood that when the amine or amide reactant itself contains the

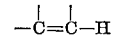

grouping which is common to each of the olefinic reactants, it may function as both the nucleophilic nitrogen-containing reactant and olefin reactant and react with itself. This aspect of the present invention is illustrated, for example, by the following interraction of acrylamide with itself in the presence of palladous chloride.

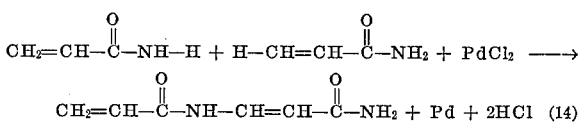

Although the invention has been described with relation to specific conditions and operating techniques, various modifications and alterations may become apparent to those skilled in the art without departing from the scope of this invention.

Having described our invention, we claim:

1. A process which comprises reacting an ethylenically unsaturated compound having at least one hydrogen attached to an ethylenic carbon thereof with a nitrogen-containing organic compound selected from the group consisting of primary and secondary organic amines and primary and secondary organic amides having at least one N-bonded hydrogen atom; in the presence of a salt of a Group VIII metal having an atomic number of at least 44 and at a temperature within the range of from about −15° to about 400° Fahrenheit, to produce an N-substituted alpha,beta-ethylenically unsaturated derivative of said nitrogen-containing organic compound.

2. Process of claim 1 in which said ethylenically unsaturated compound is a hydrocarbon olefin containing up to 22 carbon atoms and said Group VIII metal salt is a halide salt.

3. Process of claim 2 in which said reaction is carried out in a polar organic solvent.

4. Process of claim 2 in which said reaction is carried out at an above-atmospheric pressure.

5. Process of claim 2 in which said nitrogen-containing organic compound is a 2-pyrrolidone.

6. Process of claim 2 in which said nitrogen-containing organic compound is a carbazole.

7. Process as defined in claim 2 in which said nitrogen-containing organic compound is a primary amine having the formula $C_nH_{2n+1}NH_2$ in which $n$ is an integer from 1 to 20.

8. Process as defined in claim 2 in which said nitrogen-containing organic compound is a secondary amine having the formula $(C_nH_{2n+1})_2NH$ in which $n$ is an integer of from 1 to 20.

9. Process as defined in claim 2 in which said nitrogen-containing organic compound is a primary amide having the formula $C_nH_{2n+1}CONH_2$ in which $n$ is an integer of from 1 to 20.

10. Process as defined in claim 2 in which said nitrogen-containing organic compound is a secondary amide having the formula $(C_nH_{2n+1})_2CONH$ in which $n$ is an integer of from 1 to 20.

11. The process of claim 1 in which said nitrogen-containing organic compound is a primary amine.

12. The process of claim 1 in which said nitrogen-containing organic compound is a secondary amine.

13. The process of claim 1 in which said nitrogen-containing organic compound is a primary amide.

14. The process of claim 1 in which said nitrogen-containing organic compound is a secondary amide.

15. The process of claim 1 in which said ethylenically unsaturated compound is a normally gaseous hydrocarbon. unsaturated compound is a normally gaseous olefin.

16. A process for the preparation of N-ethylenically unsaturated organic substituted lactams which comprises effecting contact between a lactam containing nitrogen bonded directly to hydrogen and an ethylenically unsaturated hydrocarbon free of acetylenic unsaturation in the presence of a reducible metal compound as the catalyst therefor, said metal compound being capable of possessing the higher of two stable valence states while complexed with said unsaturated hydrocarbon and the metal moiety of said metal compound being a precious metal of the transition series.

17. The process of claim 16 wherein there is provided in said reaction a metal compound co-oxidant in the higher of at least two stable oxidized states which, upon reduction of said catalyst, affects oxidation of said catalyst, thereby regenerating said catalyst for further reaction of said ethylenically unsaturated hydrocarbon with said lactam, the metal moiety of said metal compound co-oxidant being of the group consisting of copper, chromium, cobalt, nickel, molybdenum, manganese, lead, cerium, and mixtures thereof.

18. The process of claim 17 wherein said catalyst is a precious metal of the transition series in oxidized state.

19. The process of claim 18 wherein the catalyst is an oxidized metal selected from the group consisting of palladium, platinum, iridium, rhodium, ruthenium, and osmium.

20. The process of claim 19 wherein the catalyst is palladium.

21. The process of claim 20 wherein palladium is employed in the oxidized form selected from the group consisting of salts and coordination complexes of palladium.

22. The process of claim 21 wherein the ethylenically unsaturated hydrocarbon is an olefin free of acetylenic unsaturation.

23. The process of claim 22 wherein the olefin is ethylene.

24. The process of claim 23 wherein the lactam is 2-pyrrolidone and the reaction product is N-vinyl-2-pyrrolidone.

25. The process of claim 17 wherein the co-oxidant is a copper salt.

26. The process of claim 2 wherein the co-oxidant is a copper salt.

27. The process of claim 23 wherein the co-oxidant is a copper salt.

28. A process which comprises reacting ethylene and 2-pyrrolidone in the presence of palladium chloride to produce N-vinyl-2-pyrrolidone.

29. A process which comprises reacting ethylene and carbazole in the presence of palladium chloride to produce N-vinyl carbazole.

30. A process which comprises reacting isobutene and diethylamine in the presence of palladium chloride to produce diethylisobutenyl amine.

References Cited

Smith, The Chem. of Open-Chain Org. Nitrogen Compounds (Benjamin, New York, 1965), pp. 26–29.

HENRY R. JILES, Primary Examiner

C. M. SHURKO, Assistant Examiner

U.S. Cl. X.R.

23—87; 260—94.7, 293, 249.6, 315, 326.5, 478, 482, 557, 558, 559, 561, 562, 563, 568, 570.5, 571, 576, 583, 584, 240, 239.3